(12) United States Patent
Roychoudhury et al.

(10) Patent No.: US 8,284,768 B2
(45) Date of Patent: Oct. 9, 2012

(54) DYNAMIC BUS-BASED VIRTUAL CHANNEL MULTIPLEXING DEVICE DRIVER ARCHITECTURE

(75) Inventors: Tilakraj Roychoudhury, Santa Clara, CA (US); Richard Thomas Kavanaugh, Encinitas, CA (US)

(73) Assignee: Sierra Wireless, Inc., Richmond, British Columbia (CA)

( * ) Notice: Subject to any disclaimer, the term of this patent is extended or adjusted under 35 U.S.C. 154(b) by 1275 days.

(21) Appl. No.: 11/545,043

(22) Filed: Oct. 5, 2006

(65) Prior Publication Data

US 2007/0083873 A1    Apr. 12, 2007

Related U.S. Application Data

(60) Provisional application No. 60/724,837, filed on Oct. 6, 2005.

(51) Int. Cl.
*G01R 31/08* (2006.01)
*G06F 11/00* (2006.01)
*G06F 3/00* (2006.01)
*G06F 13/12* (2006.01)
*G06F 13/38* (2006.01)
*G06F 13/00* (2006.01)
*G06F 9/44* (2006.01)
*G06F 9/46* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............ 370/360; 370/236; 370/352; 710/1; 710/72; 710/100; 719/321; 719/328

(58) Field of Classification Search .................. 370/236, 370/352; 710/1, 72, 100; 719/321, 327
See application file for complete search history.

(56) References Cited

U.S. PATENT DOCUMENTS

| 6,058,441 | A  | 5/2000 | Shu .............................. 710/100 |
| 6,205,502 | B1 | 3/2001 | Endo et al. .................... 710/100 |
| 6,260,084 | B1 | 7/2001 | Wilson et al. .................. 710/38 |
| 6,718,412 | B2 | 4/2004 | Purcell et al. ................ 710/109 |
| 6,728,819 | B2 | 4/2004 | Farmwald et al. |
| 6,754,811 | B1 | 6/2004 | Cato et al. .................... 712/227 |

(Continued)

OTHER PUBLICATIONS

"3rd Generation Partnership Project, Technical Specification Group Terminals; Terminal Equipment to User Equipment," (TE-UE) multiplexer protocol 27.010 spec, 3GPP TS 27.010, V6.0.0 Technical Specification; http://www.3gpp.org/ftp/specs/html-info/27010.htm, Dec. 2004, pp. 1-56.

(Continued)

*Primary Examiner* — Hassan Phillips
*Assistant Examiner* — Lonnie Sweet
(74) *Attorney, Agent, or Firm* — Nixon Peabody LLP

(57) ABSTRACT

Dynamic bus-based virtual channel multiplexing may be accomplished by establishing one or more virtual channels with a multiplexing device function driver and a multifunction device coupled to a bus, determining one or more functions to be activated on the device, and for each activated function, launching a second-tier function driver to handle operation of the activated function. The second-tier function driver has a function driver type. Establishment of the one or more virtual channels is accomplished using a multiplexing protocol and multiplexing device function driver with the multifunction device via a bus driver coupled to the bus.

29 Claims, 6 Drawing Sheets

U.S. PATENT DOCUMENTS

| | | | |
|---|---|---|---|
| 6,832,273 B2 | 12/2004 | Ray et al. | 710/42 |
| 6,862,643 B2 | 3/2005 | Wu et al. | 710/302 |
| 7,821,974 B2 * | 10/2010 | Yao et al. | 370/310 |
| 2002/0041589 A1 * | 4/2002 | Novak et al. | 370/352 |
| 2003/0037180 A1 | 2/2003 | Madineni et al. | |
| 2005/0091441 A1 * | 4/2005 | Qi et al. | 711/5 |
| 2005/0188257 A1 | 8/2005 | Morita | |
| 2005/0223119 A1 * | 10/2005 | Keys et al. | 710/1 |
| 2006/0025075 A1 * | 2/2006 | Chung et al. | 455/41.2 |
| 2006/0070090 A1 * | 3/2006 | Gulkis | 719/328 |
| 2007/0283052 A1 | 12/2007 | Wojewoda et al. | |

OTHER PUBLICATIONS

International Search Report for PCT/US06/39264, mailed Sep. 23, 2008.

* cited by examiner

DYNAMIC BUS-BASED VIRTUAL CHANNEL MULTIPLEXING DEVICE DRIVER ARCHITECTURE

STATEMENT OF RELATED APPLICATION(S)

This application claims the benefit of provisional patent application No. 60/724,837 filed Oct. 6, 2005, entitled "Dynamic Bus-Based Virtual Channel Multiplexing Device Driver Architecture".

TECHNICAL FIELD

The present disclosure relates generally to virtual channel multiplexing.

BACKGROUND

All computer systems comprise a co-operating collection of devices. The central processing unit (CPU) is responsible for most compute functions. However, data must be passed onto and off of the CPU in order for the computer system to be useful to the user. Keyboard, displays, mouse, etc are all necessary peripheral equipment for the computer user to interact with the system. Initially, all these peripherals have been attached to the computer through dedicated interfaces. For example, the keyboard connects through the keyboard port, the mouse connects through the mouse port, and the display device connects through yet another dedicated port. As computer systems have evolved to provide more functionality, more peripherals have been introduced. Network connections were added to enhance interconnectivity to other computer systems. Scanning interfaces were added to allow direct input of image data. Printer interfaces add the ability to produce hard copy of the data being manipulated. Video cameras, graphics tablets, external storage devices, etc. all have contributed to a complex wiring configuration in computer systems.

To address this problem, interface bus systems have been developed. Small Computer System Interface (SCSI) was one such parallel bus. This bus system allowed high-speed connection of multiple devices to a single interface on the computer system. However, the standard did not allow for "hot-plugging," thus requiring the computer system to be powered down for every change in peripheral device attachment configuration. The more popular Universal Serial Bus (USB) architecture was introduced in recent years. This bus allowed "hot-plugging" and automatic configuration of peripheral devices as they are added. The system of "plug-and-play" was also addressed by the USB architecture so that the appropriate device driver is launched on detection of a new peripheral device being added onto the bus.

FIG. 1 illustrates an example bus driver architecture. The USB architecture and the bus driver software on the computer's operating system together service the devices (116, 118, 120) on the bus 114. The primary responsibilities of a bus driver 112 are to enumerate the devices (116, 118, 120) on its bus 114, respond to Plug and Play (PnP) requests, respond to power management requests, multiplex access to the bus 114, and administer the devices (116, 118, 120) on the bus 114. Function drivers (106, 108, 110) are then established as the main driver for the device (116, 118, 120). A function driver (106, 108, 110) is typically written by the device vendor and is required. The PnP Manager loads at most one function driver (106, 108, 110) for a device (116, 118, 120). The same function driver (106, 108, 110) can service one or more devices (116, 118, 120). A function driver (106, 108, 110) provides the operational interface for its device (116, 118, 120). Typically, the function driver (106, 108, 110) handles reads and writes to the device (116, 118, 120) and manages device power policy.

FIG. 2 illustrates an example bus driver architecture for multi-function devices. On the Windows operating system, a multifunction device 222 is supported by defining it to occupy one device location on its bus 214, but contains more than one functional unit (216, 218). Each functional unit (216, 218) corresponds to a driver (206, 208, 210)). Examples of multi-function devices include combination modem/network adapters, combination audio/game ports, and so on. Such devices appear to the operating system as multiple separate devices. For example, an add-on sound card that implements audio and gameport capabilities appear as two independent devices, one serviced by audio drivers and the other serviced by a gameport driver.

The operating system places a restriction on these functional units (216, 218, 220). Each functional unit (216, 218, 220) must be able to operate as a separate device, even if it happens to be serviced by an instance of the same driver(s) as another functional unit on the device (222, 220). In particular, functional units on a multifunction device 222 must not have start-order dependencies, the resource requirements of one functional unit must not be expressed in terms of another functional unit, the operation of one functional unit must not affect or interfere with the operation of another functional unit on the multifunction device 222 or on the system as a whole, each functional unit must be enumerated and its resource requirements communicated to the operating system so the system can load the necessary drivers and assign resources to the different units in any order.

The above capabilities and restrictions of device attachment on a USB bus on Windows based system have been successful in serving a large number of peripheral devices. However, as computing systems evolve in sophistication, the peripheral devices are also growing in complexity and functionality. The peripheral devices are becoming self-contained computing systems that require multiple communications channels to interact with the operating system. Each of these communications channels may be used to effect different functions. For example, wireless wide area networking devices need to interact with the operating system to convey several streams or channels simultaneously for streams such as, but not limited to, a primary receive and transmit data paths, additional data channels for wireless network access using multiple contexts or separate Quality of Service data channels over the same context, a control and status channel, a diagnostics and maintenance channel, and a Location Based Services (LBS) channel running a location protocol such as the National Marine Electronics Association (NMEA) protocol. Each of these channels requires independent data transfer channels and independent driver handling. Yet these channels cannot be considered independent devices on the bus since they may have start-order dependencies. For example, the control and status data path channel might need to be started prior to any of the other channel paths in order to query the device and the network it is communicating with to determine what services the network and device are capable of before attempting to open one of the other channels that are dependent on one or more of these services.

Windows driver designers address more complex devices like the ones described in the previous paragraphs with the use of multifunction drivers for multifunction devices. A multifunction driver is a bus driver and thus has several advantages. A multifunction driver can enumerate a virtual device in the system for each of the streams, or channels, from a single physical device. Thus if a multifunction device supports more than one channel (e.g. a data channel, a control and status channel, a diagnostics channel, and a location based services channel (LBS) for a complex modem), then the multifunction driver can create a virtual device in the system for each of the channels of the multifunction device. In addition to this, the set of virtual devices created in the system for the device can be composed of a different set of device types (e.g. modem ports, COM ports, network adapters, etc.).

Another advantage of a multifunction driver is that it also allows for virtual devices to be dynamically loaded and unloaded in the system at any time while the driver is loaded. However, contemporary multifunction device drivers contain a static configuration that does not allow these drivers to take advantage of this feature because the configuration presented by the hardware device to specify the virtual devices to be presented in the system is static in nature. So the set of virtual devices to be presented in the system can only be done so at the time the multifunction driver is loaded for the device in the system. In order to change the set of virtual devices, the multifunction device must be re-enumerated, by either being removed from the host system or being subject to a power cycle or reset operation, with a new or alternative set of device interface configuration parameters. This is one disadvantage of the multifunction driver architecture approach.

This static nature of device configurations presented by multifunction devices 322 creates other limitations on the use of multifunction drivers 312. Channels cannot be dynamically added or removed based on run-time decisions or non-volatile memory setting in host platform or device. The virtual channels must be established at the time the device 322 is enumerated in the host system. In order to change the virtual channel/device configuration, the device must be re-enumerated, by either being removed from the host system or being subject to a power cycle or reset operation, with a new or alternative set of device interface configuration parameters. Another disadvantage is that definitions of new virtual channels and/or devices require a new device configuration rather than just a firmware, software, or non-volatile memory upgrade.

Since the method for specifying the channel and virtual devices to be established is driven by the device configuration, the host system has no opportunity to influence the set of virtual channels/devices to be supported beyond what is presented in the device configuration to the host. This can be considered as a master-slave relationship and thus is another disadvantage as it would be advantageous to allow the host system to have influence or control over the set of channels and virtual devices to be established beyond what is presented in the device configuration to the host.

One more disadvantage of the multifunction driver architecture, is that the number of virtual devices that are exposed are subject to the configuration restrictions imposed by certain bus specification associated with the device type (i.e. a USB or PCI-Express device bus specification). These configurations could have size or entry limitations that indirectly limit the number of channels or virtual devices that the device configuration can specify to the host system.

Many of the disadvantages of a multifunction driver architecture described in the previous paragraph are supported through the implementation of a virtual channel multiplexing driver architecture. FIG. 3 illustrates an example non-bus based virtual channel multiplex driver architecture. Channel multiplexing protocols allows a number of simultaneous sessions, or channels, over a single asynchronous interface. Each session/channel consists of a stream of bytes transferring various kinds of data.

A virtual channel multiplexing protocol driver 312 can allow for the negotiation of the set of virtual sessions, or channels, to be established between the host and the device 322. Thus the channel establishment is a peer-to-peer relationship rather than master-slave since both the host and the device 322 can have influence over which virtual channels are to be established. Virtual channel multiplexing protocol drivers 312 can also be dynamic in nature in that they can allow virtual channels to be established and terminated at any time. Also, adding new virtual channels do not require a new device configuration since the definition of a virtual channel is outside the scope of device configuration as long as the device configuration covers the definition of the single channel for all of the virtual channels to be multiplexed over.

Though contemporary virtual channel multiplexing protocol driver architectures provide solutions for the specified limitations and disadvantages of the multifunction driver architecture, they have their own limitations since contemporary virtual channel multiplexing driver architectures do not employ the use of a bus architecture. Since these multiplexing driver architectures are not bus based, they do not allow virtual channels to be represented by a set of different virtual devices (e.g. all virtual channels have to be a COM port vs. having a combination of COM ports, modem ports, and network adapters, etc.). Also, these virtual channel multiplexing driver architectures do not allow virtual devices to be dynamically loaded or unloaded in the system. For example, when needed, a network adapter can be loaded at run time by a bus driver that supports a multifunction device 322. However, a non-bus based virtual channel multiplexing solution does not allow the device 322 to be loaded or unloaded because it only supports one device type and only presents itself as one device to the system.

So to summarize, there exists two different driver architectures out there to address the needs of these more complex multifunction devices. Though both of these driver architecture solutions provide clear advantages to address the needs of these complex multifunction devices, they also both have significant disadvantages that restrict taking advantage of the flexibility and dynamic capability of these ever more complex devices.

OVERVIEW

Dynamic bus-based virtual channel multiplexing may be accomplished by establishing one or more virtual channels with a multiplexing device function driver and a multifunction device coupled to a bus, determining one or more functions to be activated on the device, and for each activated function, launching a second-tier function driver to handle operation of the activated function. The second-tier function driver has a function driver type. Establishment of the one or more virtual channels is accomplished using a multiplexing protocol and multiplexing device function driver with the multifunction device via a bus driver coupled to the bus.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
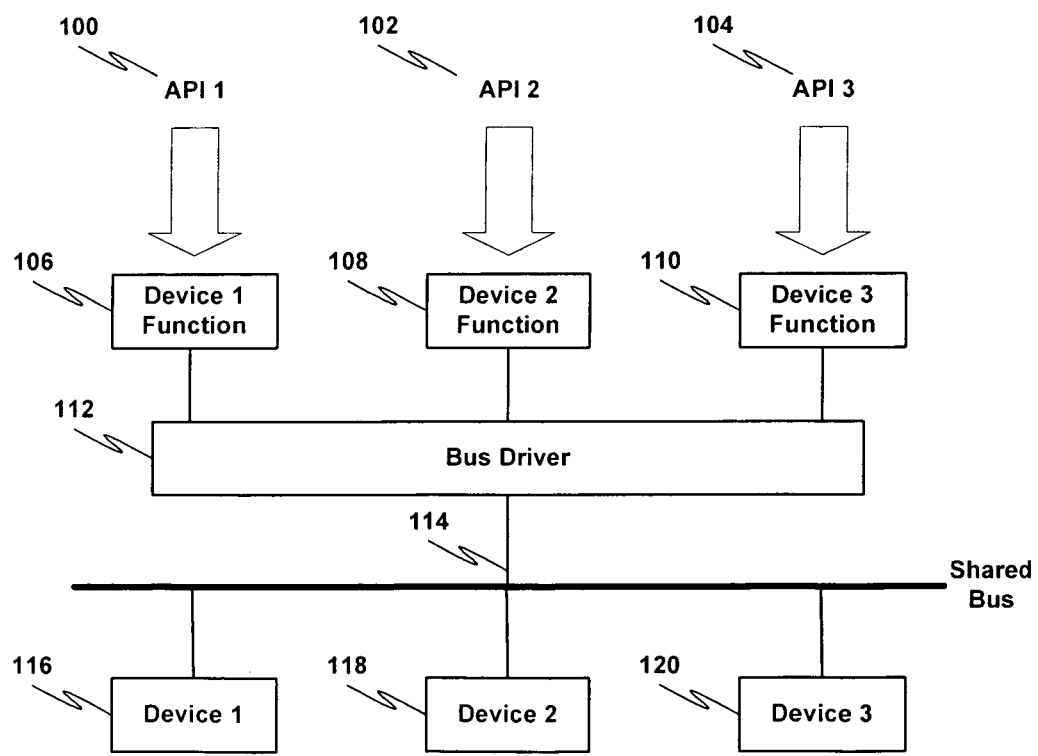
FIG. 1 illustrates an example bus driver architecture.
Figure 2:
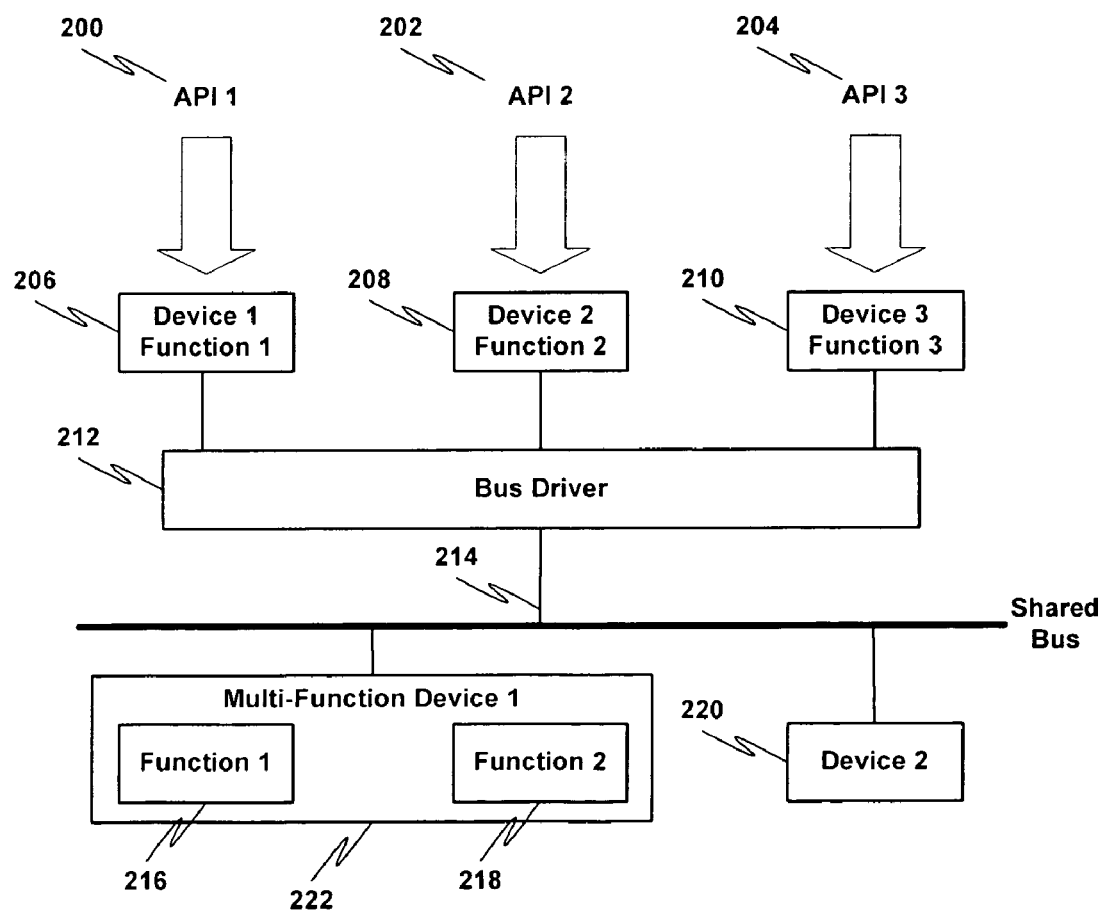
FIG. 2 illustrates an example bus driver architecture for multi-function devices.
Figure 3:
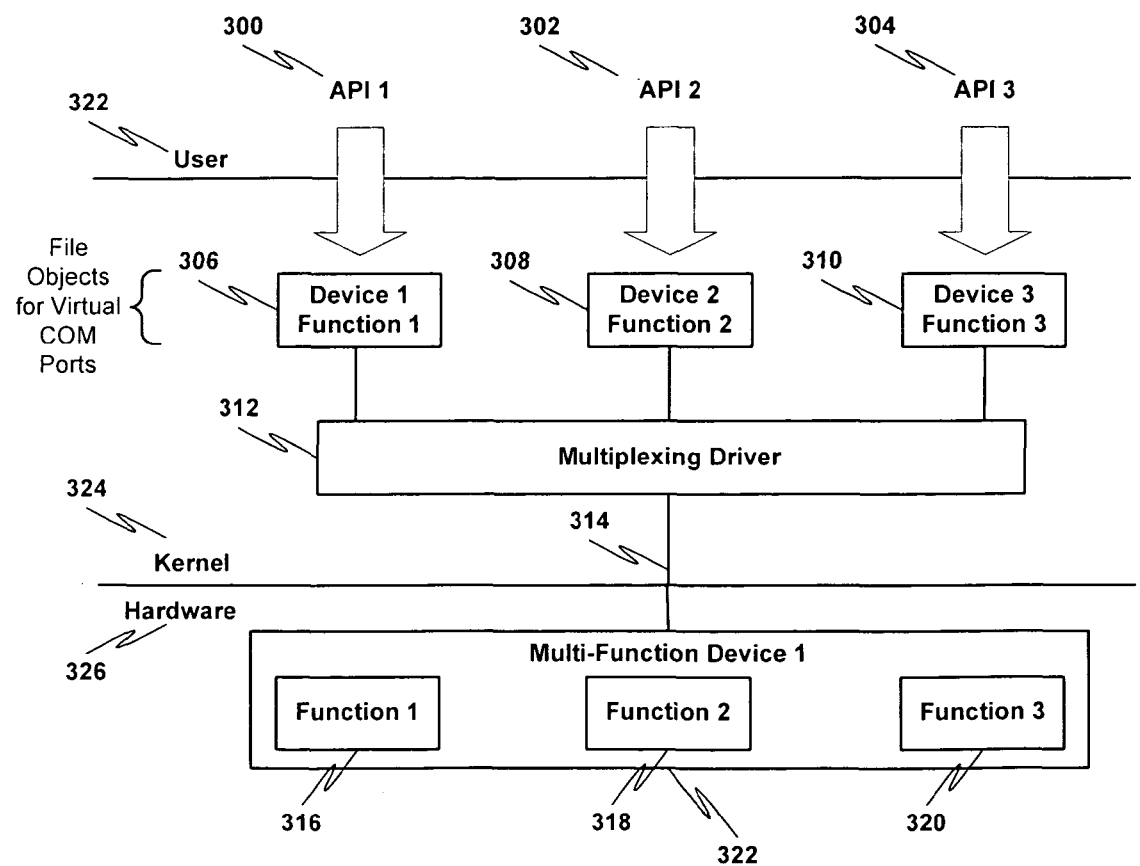
FIG. 3 illustrates an example non-bus based virtual channel multiplex driver architecture.

Example embodiments are described herein in the context of a system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

One goal achieved by example embodiments of the present invention is the providing of a dynamic and flexible driver architecture that supports multiple virtual channels having different functionality that can be presented in the host system as a set of different device types that represent the different virtual channels, that supports determining the set of virtual channels to be established by either or both the host and the device, that can support dynamic arrival and removal of virtual devices in the host system at any time that are associated with one or more of the virtual channels, and can support dynamic establishment and termination of any of the virtual channels supported as they are needed or not needed over time while the device remains connected and in use by the host system.

While the foregoing objects and goals achieved by the present invention are descriptive of various aspects and embodiments, these objects and goals should not be used to limit the scope of the inventions set forth in the description of the invention below.

According to one embodiment of the present invention, a device driver architecture communicates with a multifunction device using a virtual channel multiplexing protocol driver architecture while also employing the use of multifunction bus based driver architecture. By combining these two different approaches into a new single driver architecture, the benefits of both architectures for supporting these new and upcoming complex multifunction devices can be realized in a single combined driver architecture. In addition to the benefits afforded by the multifunction device and virtual channel multiplexing architectures described above, the dynamic bus-based virtual channel multiplexing device driver architecture of the present invention allows for virtual devices to be dynamically loaded and unloaded in the system at any time while the driver is loaded because it is not restricted by the static nature of the hardware device configurations (advantage over limitation of multifunction driver with multifunction devices with a static configuration). Furthermore, since many of the disadvantages of the two previous driver architectures discussed above are substantially orthogonal to each other (one driver architecture provides solutions for the disadvantage(s) of the other driver architecture), combining the two driver architectures into a single combined driver architecture provides a combined solution that does not have any of previously mentioned disadvantages of the two separate driver architectures. In addition, the combined driver architecture has advantages above and beyond any of the advantages in the either of the two separate driver architectures.

Figure 4:
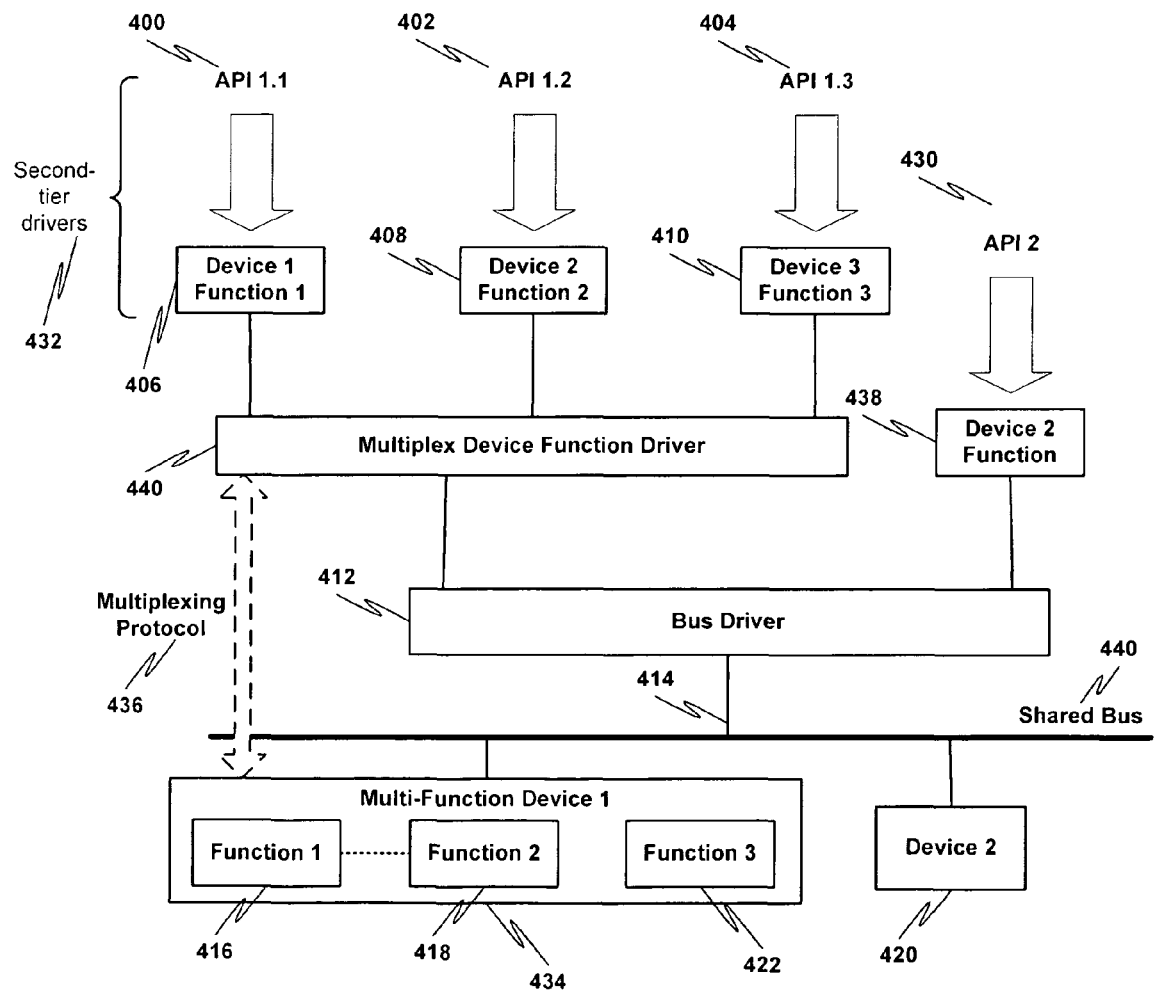
FIG. 4 illustrates an example virtual channel multiplexing device function driver which employs the use of a multifunction bus based driver.

In the combined driver architecture, the virtual channel multiplexing protocol is still used to encapsulate and decapsulate different communications protocol packets, each protocol type being associated with one of the device's functional units. However, when this device is attached to a bus, such as USB on a Windows system, the Multiplex Device Function Driver (MDFD), shown as reference numeral 440 in FIG. 4, is associated as the function driver for the multifunction device 434. This driver 440 then communicates and negotiates (peer-to-peer rather than master-slave) with the device 434 to establish the virtual channels and functions to be activated on the device 434.

In an example embodiment, the multiplexing protocol between the MDFD 440 and a multifunction device 434 can be based on a non-bus based multiplexing protocol. By way of example, the multiplexing protocol between the MDFD 440 and a multifunction device 434 can be based on the 3GPP 27.010 Terminal Equipment to User Equipment (TE-UE) multiplexer protocol.

In another example embodiment, the multiplexing protocol between the MDFD 440 and a multifunction device 434 can be based on bus specific defined interface components. By way of example, separate Universal Serial Bus (USB) endpoints for each virtual channel may be employed. For each activated function (associated with one or more established virtual channels), the MDFD 440 launches a second-tier driver (406, 408, 410) to handle the operation of that function. The second-tier drivers (406, 408, 410) that are currently established by the MDFD 440 can be composed of different driver types (i.e. COM ports, modem ports, network adapters, etc.) and are determined based on the negotiation between the device 434 and the MDFD 440. In an example embodiment, the MDFD 440 can use a fixed table lookup to associate each channel between the multifunction device and the MDFD, referred to as a the Data Link Connection (DLC) in this particular embodiment, with the appropriate second-tier function driver (406, 408, 410). For example, DLC=0 may be associated with the Control Channel function; DLC=1 may be associated with an AT/PPP data communication function; DLC=2 may be associated with the Diagnostic Mode function; DLC=3 may be associated with the Control and Status function; DLC=4 may be associated with the geo-location function. According to another example embodiment, the MDFD 440 may utilize initial configuration query mechanisms to determine the DLC to functional unit mapping. Then, it can use that information to ensure the correct second-tier function drivers (406, 408, 410) are launched or suspended on detection of the functional units (416, 418, 422).

The multiplexing protocol uses unique function identifiers to differentiate protocol units for each functional unit (416, 418, 422) of the device 434. According to an example embodiment, the unique function identifiers comprise the DLC identifiers in the 3GPP 27.010 protocol. Control information or new protocol identity detection mechanisms may be used to cause the MDFD 440 to launch the associated second-tier driver (406, 408, 410) at any time.

The MDFD 440 for the multifunction device 434 may also terminate or suspend a particular second-tier driver (406, 408, 410) at any time if the associated function has been disabled on the device 434. The device 434 does not have to be re-enumerated in the system for the set of established virtual channels, functions, and associated second-tier drivers (406, 408, 410) to change.

This driver system can therefore handle varying configurations of the multifunction device 434. A single MDFD 440 for the multifunction device 434 can be deployed to address multiple revisions and configurations of the multifunction device 434. Furthermore, customization of the multifunction device 434 necessary to satisfy different customer requirements can also be addressed with the same MDFD 440. This reduces the probability of errors introduced through maintenance of numerous unique customized device drivers. The ability to utilize a single MDFD 440 to address varying versions of similar multifunction devices 434 also reduces development costs.

Figure 5:
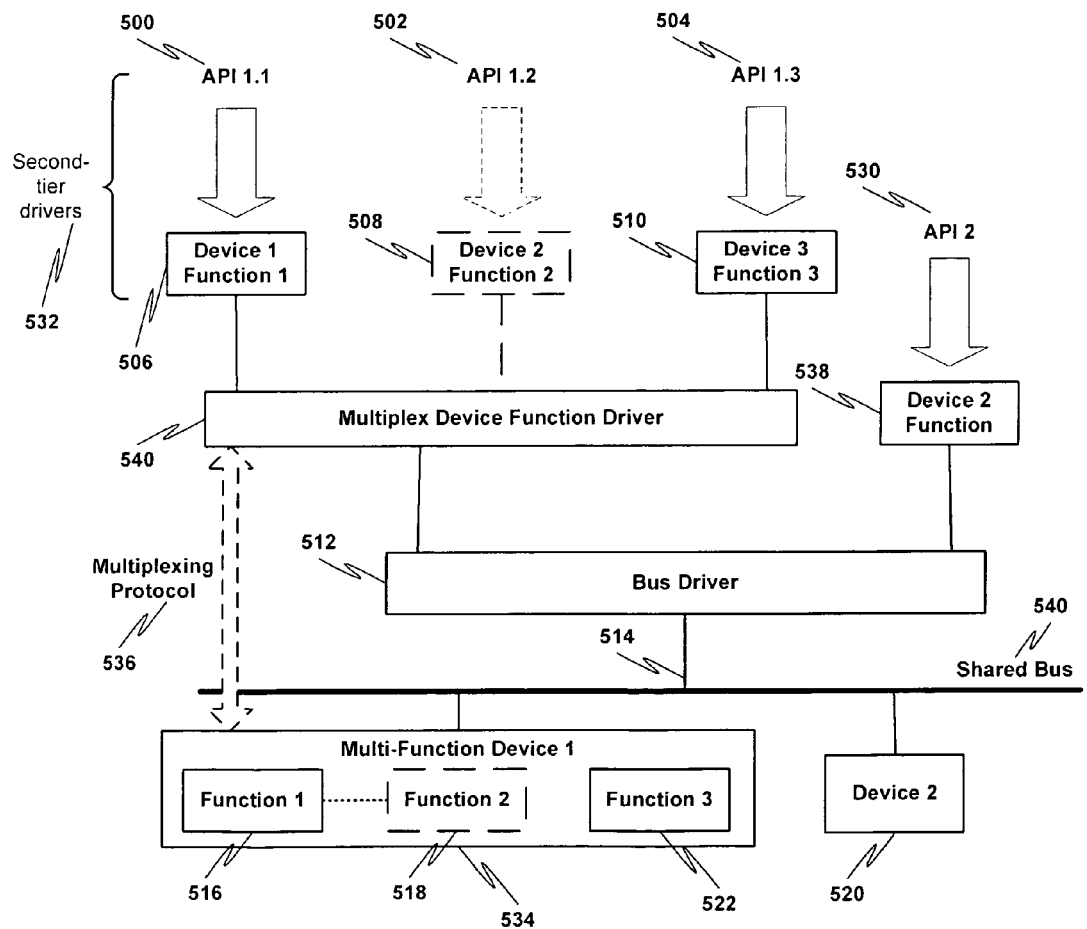
FIG. 5 illustrates the example virtual channel multiplexing device function driver of FIG. 4 having a deactivated function.

FIG. 5 illustrates where the same MDFD 540 can service a multifunction device 534 where Function 2 (518) has been deactivated or suspended. In this instance, the MDFD 540 can suspend the associated second-tier device function driver 508 and, if desired, the associated virtual channels. This flexibility is also available if a customized version of the device 534 does not include all functional units. In this case, the MDFD 540 will adjust to the customized configuration and only launch the virtual channels and second-tier function drivers (506, 508, 510) that are necessary. Applications can therefore determine the existence or absence of a functional unit (516, 518, 522) based on the existence of the associated API function calls.

Figure 6:
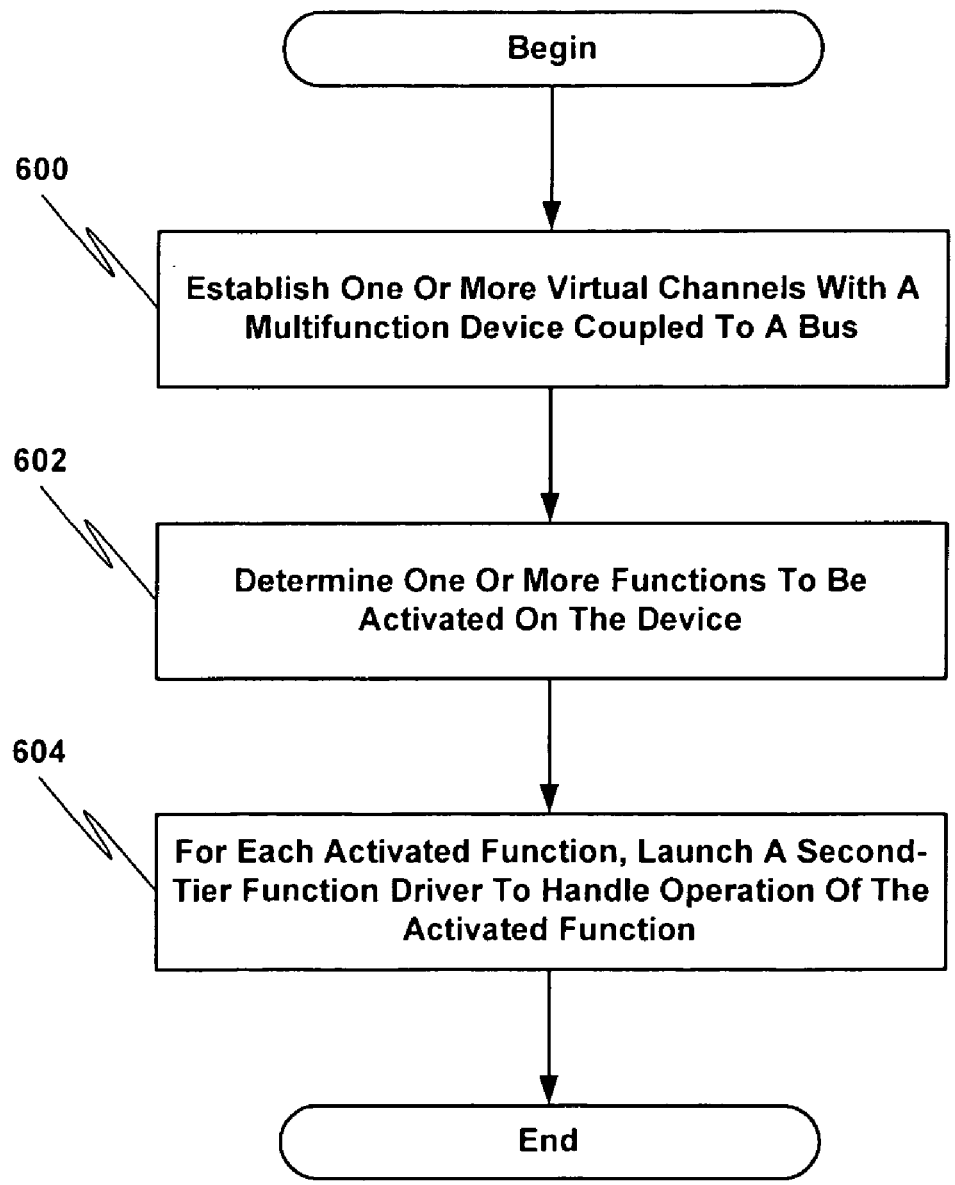
FIG. 6 illustrates an example method example for dynamic bus-based virtual channel multiplexing.

FIG. 6 illustrates an example method example for dynamic bus-based virtual channel multiplexing. The processes illustrated in FIG. 6 may be implemented in hardware, software, firmware, or a combination thereof. FIG. 6 illustrates the operation of multiplex device function driver 440 of FIG. 4 and multiplex device function driver 550 of FIG. 5. At 600, one or more virtual channels with a multiplexing device function driver and a multifunction device coupled to a bus are established. A multiplexing protocol and a multiplexing device function driver with the multifunction device is used. At 602, a determination is made regarding one or more functions to be activated on the device. At 604, for each activated function in reference numeral 602, a second-tier function driver is launched to handle operation of the activated function. Each second-tier function driver has a function driver type associated with it.

While the foregoing descriptions refer to the USB architecture for illustrative purposes, those of ordinary skill in the art will readily appreciate that the inventions disclosed herein are not necessarily limited to the USB architecture. For example, the PCI-Express (PCIe) and the Institute of Electrical and Electronic Engineers 1394 (IEEE 1394) buses may also be used.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An apparatus for dynamic bus-based virtual channel multiplexing, comprising:
    a bus;
    a bus driver coupled to the bus;
    a multifunction device coupled to the bus and configured with a plurality of functions; and
    a Multiplex Device Function Driver (MDFD) coupled to the bus driver and configured to:
        establish one or more virtual channels with the device using a peer-to-peer multiplexing protocol between the MDFD and the device via the bus driver, wherein the bus driver and the device have equal responsibility for initiating, maintaining, and terminating the one or more virtual channels;
        determine one or more of the plurality of functions to be activated on the device, each activated function associated with one or more established virtual channels; and
        for each activated function, launch a second-tier function driver to handle operation of the activated function, the second-tier function driver having a function driver type.

2. The apparatus of claim 1 wherein the MDFD is configured to use a fixed table lookup to associate each of the one or more virtual channels between the device and the MDFD with one of the second-tier function drivers.

3. The apparatus of claim 1 wherein the MDFD is configured to use a fixed table lookup to associate a Data Link Connection (DLC) with one of the second-tier function drivers.

4. The apparatus of claim 1 wherein the function driver type comprises one or more of a Control Channel function, a data communication function, a diagnostic mode function, a control and status function, and a geo-location function.

5. The apparatus of claim 1 wherein the MDFD is configured to use one or more initial configuration query mechanisms to associate a Data Link Connection (DLC) with one of the second-tier function drivers.

6. The apparatus of claim 1 wherein the device is configured to use one or more unique function identifiers to differentiate protocol units for each functional unit of the device.

7. The apparatus of claim 6 wherein the one or more unique function identifiers comprise Data Link Connection (DLC) identifiers in the 3GPP 27.010 protocol.

8. The apparatus of claim 1 wherein the bus comprises a Universal Serial Bus (USB).

9. The apparatus of claim 1 wherein the bus comprises an Institute of Electrical and Electronic Engineers 1394 (IEEE 1394) bus.

10. The apparatus of claim 1 wherein the bus comprises a Peripheral Component Interconnect (PCI)-Express (PCIe) bus.

11. The apparatus of claim 1 wherein the multiplexing protocol comprises a non-bus based multiplexer protocol.

12. The apparatus of claim 11 wherein the multiplexing protocol comprises the 3GPP 27.010 Terminal Equipment to User Equipment (TE-UE) multiplexer protocol.

13. The apparatus of claim 1 wherein the multiplexing protocol is based on one or more bus specific defined interface components.

14. The apparatus of claim 13 wherein the one or more bus specific defined interface components comprises one or more separate Universal Serial Bus (USB) endpoints for each virtual channel.

15. A computer implemented method for dynamic bus-based virtual channel multiplexing, comprising:
by a Multiplex Device Function Driver (MDFD), establishing one or more virtual channels with a multifunction device coupled to a bus and configured with a plurality of functions, the establishing using a peer-to-peer multiplexing protocol and the multiplexing device function driver with the device via a bus driver coupled to the bus, wherein the bus driver and the device have equal responsibility for initiating, maintaining, and terminating the one or more virtual channels;
determining one or more of the plurality of functions to be activated on the device, each activated function associated with one or more established virtual channels; and
for each activated function, launching a second-tier function driver to handle operation of the activated function, the second-tier function driver having a function driver type.

16. The method of claim 15, further comprising using a fixed table lookup to associate each of the one or more virtual channels between the device and the MDFD with one of the second-tier function drivers.

17. The method of claim 15, further comprising using a fixed table lookup to associate a Data Link Connection (DLC) with one of the second-tier function drivers.

18. The method of claim 15 wherein the function driver type comprises one or more of a Control Channel function, a data communication function, a diagnostic mode function, a control and status function, and a geo-location function.

19. The method of claim 15, further comprising using one or more initial configuration query mechanisms to associate a Data Link Connection (DLC) with one of the second-tier function drivers.

20. The method of claim 15, further comprising using one or more unique function identifiers to differentiate protocol units for each functional unit of the device.

21. The method of claim 20 wherein the one or more unique function identifiers comprise Data Link Connection (DLC) identifiers in the 3GPP 27.010 protocol.

22. The method of claim 15 wherein the bus comprises a Universal Serial Bus (USB).

23. The method of claim 15 wherein the bus comprises an Institute of Electrical and Electronic Engineers 1394 (IEEE 1394) bus.

24. The method of claim 15 wherein the bus comprises a Peripheral Component Interconnect (PCI)-Express (PCIe) bus.

25. The method of claim 15 wherein the multiplexing protocol comprises a non-bus based multiplexer protocol.

26. The method of claim 25 wherein the multiplexing protocol comprises the 3GPP 27.010 Terminal Equipment to User Equipment (TE-UE) multiplexer protocol.

27. The method of claim 15 wherein the multiplexing protocol is based on one or more bus specific defined interface components.

28. The method of claim 27 wherein the one or more bus specific defined interface components comprises one or more separate Universal Serial Bus (USB) endpoints for each virtual channel.

29. A nontransitory program storage device readable by a machine, embodying a program of instructions executable by the machine to perform a method for dynamic bus-based virtual channel multiplexing, the method comprising:
by a Multiplex Device Function Driver (MDFD), establishing one or more virtual channels with a multifunction device coupled to a bus and configured with a plurality of functions, the establishing using a peer-to-peer multiplexing protocol and the multiplexing device function driver with the device via a bus driver coupled to the bus, wherein the bus driver and the device have equal responsibility for initiating, maintaining, and terminating the one or more virtual channels;
determining one or more of the plurality of functions to be activated on the device, each activated function associated with one or more established virtual channels; and
for each activated function, launching a second-tier function driver to handle operation of
the activated function, the second-tier function driver having a function driver type.

* * * * *